UNITED STATES PATENT OFFICE.

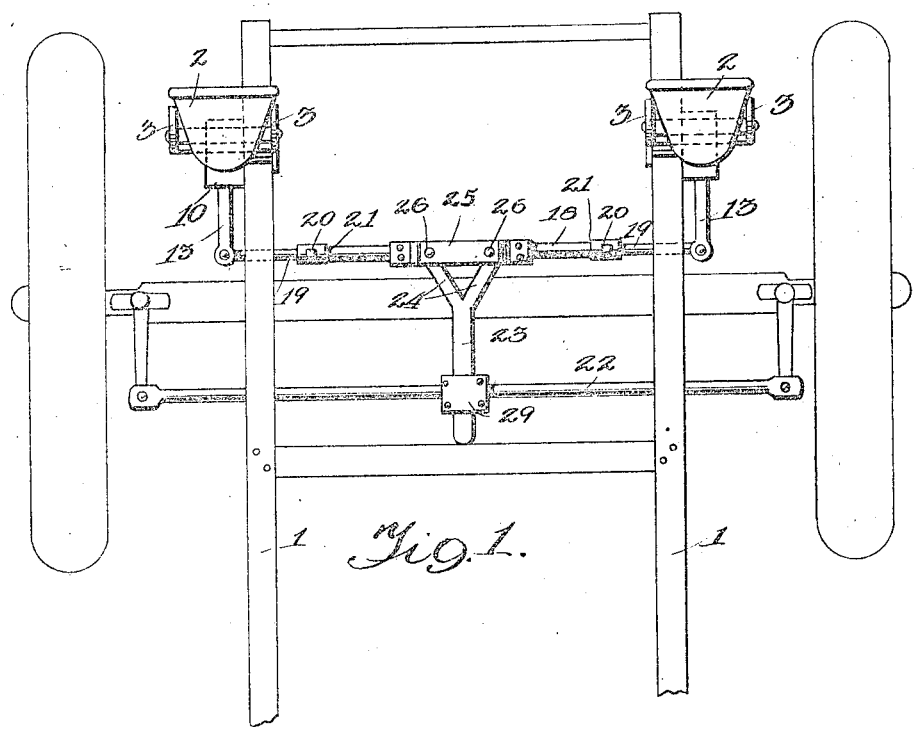
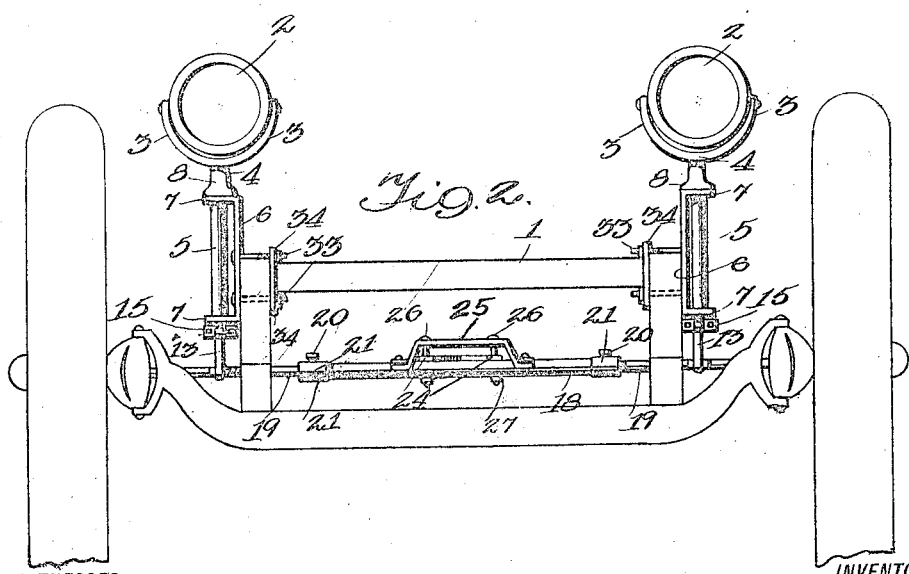

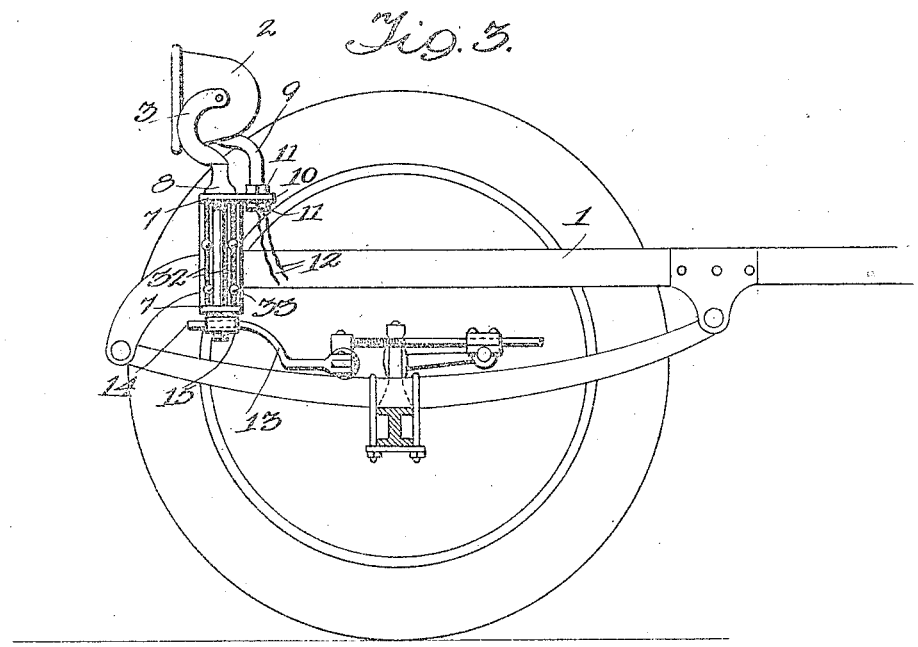
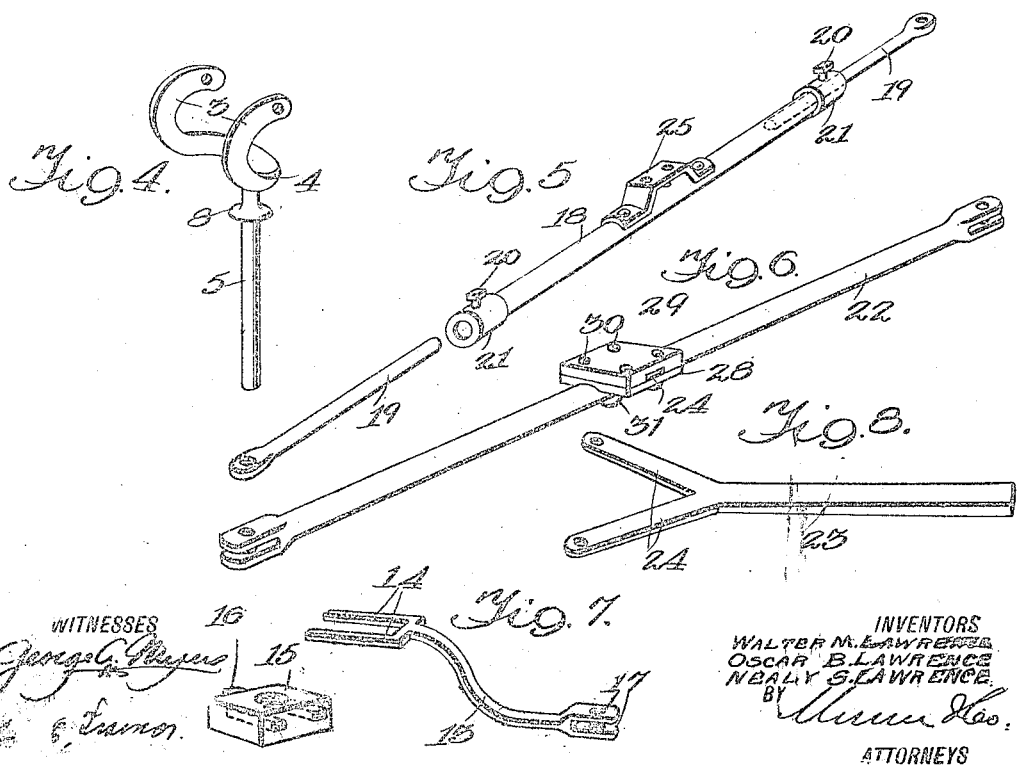

WALTER MARCELLUS LAWRENCE, OSCAR BLEDSOE LAWRENCE, AND NEALY SUMMERS LAWRENCE, OF BIRMINGHAM, ALABAMA.

DIRIGIBLE HEADLIGHT.

1,380,657.

Specification of Letters Patent.

Patented June 7, 1921.

Application filed December 9, 1919. Serial No. 343,652.

*To all whom it may concern:*

Be it known that we, WALTER M. LAWRENCE, OSCAR B. LAWRENCE, and NEALY S. LAWRENCE, citizens of the United States, and residents of Birmingham, in the county of Jefferson and State of Alabama, have invented certain new and useful Improvements in Dirigible Headlights, of which the following is a specification.

Our invention is an improvement in dirigible headlights, and the invention has for its object to provide headlights of the character specified especially adapted for use in motor vehicles, wherein the headlights are connected with the steering mechanism, to constrain the rays of light to turn with the vehicle, and a special object of the invention is to provide supporting mechanism for the reflectors independent of the supporting mechanism for the lamps, for permitting the reflectors to be turned without affecting the lamps.

A further object of the invention is to provide mechanism for permitting the attachment to be applied to cars of different size and for providing resiliency between the lights and the steering mechanism, to prevent breakage or injury from shock or jar.

A further object of the invention is to provide means for connecting the lamps to the vehicle in such manner that they may be adjusted vertically with respect to the vehicle.

In the drawings:

Figure 1 is a partial top plan view of the frame of a motor vehicle provided with the headlights;

Fig. 2 is a front view;

Fig. 3 is a partial side view;

Fig. 4 is a perspective view of the support for the reflector;

Fig. 5 is a similar view of the connection between the controlling arms of the headlights;

Fig. 6 is a perspective view of the connection between the steering knuckles;

Fig. 7 is a perspective view of the connection between the elements shown in Fig. 5 and the reflector supporting posts;

Fig. 8 is a similar view of the connection between the elements shown in Figs. 5 and 6.

The present embodiment of the invention is shown in connection with the frame 1 of a motor vehicle, the reflectors and casings 2 of the headlights being supported by the arms 3 of a yoke, whose body 4 is connected to the upper end of a post or shaft 5.

This post or shaft is journaled in a bracket plate 6 which is connected to the frame in a manner to be presently described, and the said plate has laterally extending lugs 7 at its ends, which are provided with openings in which the post is mounted. It will be noticed, referring to Fig. 4, that the post has an annular rib 8 near the yoke 4 for limiting the downward movement of the post with respect to the bracket, and that the arms 3 of the yoke 3—4 are curved and are arranged with their convex edges forward, as shown, for a purpose to be presently described. These arms are pivoted to the casing 2, as shown, and the light or lamp (not shown) is arranged within the reflector.

The lamp (not shown) is connected with an arm 9 consisting of two laterally offset portions, one of which carries the lamp and the other of which is rigidly connected with a lateral extension 10 from the upper lug 7 of the bracket plate 6. This end of the arm 9 is passed through the extension and is engaged by lock nuts 11 above and below the extension. The arm 9 is hollow, and the lead wires 12 of the electric circuit pass upwardly through the hollow arm to the lamp. This arm extends through the reflector casing 2 at the bottom thereof, at the vertical axis upon which the casing rotates, and the forward bends of the arms 3 are for the purpose of permitting the swinging movement of the reflector without interference on the part of the arm 9.

A link 13, shown more particularly in Fig. 7, is secured to the lower end of each post, and each link consists of two portions offset laterally with respect to each other, as shown, and one of the said portions has a fork, whose arms 14 extend through openings in a block 15 which is mounted to move vertically on the lower end of the post and is held in adjusted position in any suitable or desired manner, as, for instance, by a set screw 16. The opposite end of each link has vertically spaced ears 17 which engage between them the end of a connecting rod consisting of a central tubular section 18 and lateral sections 19, which engage within the ends of the central section and are adjustably connected thereto by set screws 20. These set screws are threaded through cuffs 21 rigid with the ends of the central section and the ends of the lateral sections 19 are flattened, as shown in Fig. 5, to fit between the ears 17.

This rod 18—19 connects the links 13 of the two lamps, constraining them to swing together, and the plate is connected to the spindle connecting rod 22, by means of the Y-shaped plate 23—24 shown in Fig. 8, the reference character 23 designating the body of the plate and the character 24 the arms.

A substantially U-shaped clip 25 is connected with the upper face of the central section 18 of the rod 18—19 at its center, and the body of the clip and the plate have registering openings for receiving bolts 26 which connect the arms of the Y-shaped plate to the rod 18—19. The bolts are engaged by nuts 27 below the connecting rod. The ends of the fork arms are received between the clip 25 and the body of the section 18, and it will be noticed that the distance between the body of the clip and the central section is greater than the thickness of the yoke arms, so that the said arms may move vertically within limits between the clip and the connecting rod.

The rear end of the plate 23—24 is adjustably connected with the spindle connecting rod 22 before mentioned by means of the clamp shown more particularly in Fig. 6. This clamp consists of a lower section 28 and an upper section 29, which are connected together by bolts and nuts 30 in such manner that they may be secured tightly together on the body of the Y-shaped plate 23 or loosened to permit said plate body to move transversely of the rod 22. The upper section 29 is grooved to receive the plate body as shown, and the lower section is connected to the rod by means of clips 31. The said lower section is grooved transversely to receive the rod, and the clips firmly connect the clamp to the rod. Referring to Fig. 8, it will be seen that the plate 23—24 gradually decreases in thickness from its rear to its front end, thus providing resiliency so that the shock and jar on the wheels is not transmitted to the operating mechanism for the lamp. By loosening the nuts of the bolts 30 the plate 23 may be adjusted transversely of the rod 22 to permit the attachment to be applied to vehicles of various sizes.

The bracket plates 6—7 are vertically adjustable on the frame 1 of the vehicle. Each of these plates has its body portion provided with vertically extending slots 32 and these slots are engaged by bolts 33 which connect the plates to the frame. Clamping plates 34 are arranged between the nuts and the frame, as shown in Fig. 2.

In operation, when the wheels of the vehicle are turned to turn the vehicle the reflectors will be turned to cause the rays of light to follow the movement of the vehicle, but the lamps will not be affected, the lamps retaining their focal position in the reflectors.

We claim:

1. In a motor vehicle, the combination with the swinging headlights and the rod connecting the headlights for constraining them to swing together, of a plate for connecting said rod with the spindle connecting rod, said plate having one end connected to the rod and arranged to move vertically with respect thereto within limits, a sliding connection between the other end of the plate and the spindle connecting rod, and means for clamping the plate to the said spindle connecting rod, said sliding connection comprising clamping sections, one of said sections being secured to the spindle connecting rod, and means for clamping the other section to the first named section.

2. In a motor vehicle, the combination with the swinging head lights, the rod connecting the lights for constraining them to swing together, and the spindle connecting the rod, of a plate for connecting said rod and the spindle connecting rod, said plate being Y-shaped and having its body connected with the spindle connecting rod to slide transversely of said rod and to be adjustable longitudinally of the rod, the arms being connected with the first named rod to move vertically with respect thereto within limits, said connection comprising a second plate secured to the rod at its ends and spaced above the rod intermediate its ends a distance greater than the thickness of the first named plate, bolts passing through the rod and the last named plate and through the arms of the first named plate.

3. In a motor vehicle, the combination with the swinging headlights, the rod connecting the lights for constraining them to swing together, and the spindle connecting rod, of a plate for connecting said rod and the spindle connecting rod, said plate being Y-shaped and having its body connected with the spindle connecting rod to slide transversely of said rod and to be adjustable longitudinally of the rod, the arms being connected with the first named rod to move vertically with respect thereto within limits.

WALTER MARCELLUS LAWRENCE.
OSCAR BLEDSOE LAWRENCE.
NEALY SUMMERS LAWRENCE.